(12) United States Patent
Stenlåås et al.

(10) Patent No.: US 9,863,352 B2
(45) Date of Patent: ***Jan. 9, 2018

(54) REGULATION OF A TEMPERATURE IN AN EXHAUST AFTERTREATMENT SYSTEM

(71) Applicant: SCANIA CV AB, Södertälje (SE)

(72) Inventors: Ola Stenlåås, Södertälje (SE); Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 323 days.

This patent is subject to a terminal disclaimer.

(21) Appl. No.: 14/433,123

(22) PCT Filed: Oct. 2, 2013

(86) PCT No.: PCT/SE2013/051143
§ 371 (c)(1),
(2) Date: Apr. 6, 2015

(87) PCT Pub. No.: WO2014/055016
PCT Pub. Date: Apr. 10, 2014

(65) Prior Publication Data
US 2015/0275800 A1    Oct. 1, 2015

(30) Foreign Application Priority Data

Oct. 2, 2012  (SE) ...................................... 1251103
Oct. 2, 2013  (SE) ...................................... 1351151

(51) Int. Cl.
*F02D 41/00*       (2006.01)
*F02D 41/14*       (2006.01)
(Continued)

(52) U.S. Cl.
CPC ......... *F02D 41/1446* (2013.01); *B60W 10/00* (2013.01); *B60W 10/10* (2013.01);
(Continued)

(58) Field of Classification Search
CPC ......... B60W 10/10; B60W 10/00; F01N 3/20; F01N 3/208; F02D 41/1446
See application file for complete search history.

(56) References Cited

U.S. PATENT DOCUMENTS 5,131,293 A    7/1992  Kaiser ........................... 477/100
5,646,842 A    7/1997  Schulz ........................... 475/127
(Continued)

FOREIGN PATENT DOCUMENTS

DE    10 2010 030 346 A1    12/2011
EP         1 384 876 A1      1/2004
(Continued)

OTHER PUBLICATIONS

International Search Report dated Feb. 7, 2014 issued in corresponding International patent application No. PCT/SE2013/051143.
(Continued)

*Primary Examiner* — Kevin A Lathers
(74) *Attorney, Agent, or Firm* — Ostrolenk Faber LLP

(57) ABSTRACT

A method for the regulation of a temperature in an exhaust stream in a motor vehicle through control of its driveline: the motor vehicle includes a driveline having a combustion engine, which may be connected to a gearbox via a clutch device, and an exhaust system for removing an exhaust stream from the engine. The method includes controlling the driveline for activation or deactivation of coasting of the vehicle based on one or several first parameters $P_1$ and one or several second parameters $P_2$ for regulation of a temperature $T_{Ex}$ in the exhaust system. At least one of the first parameters $P_1$ is a first temperature difference between the first temperature $T_1$ in the exhaust system and a reference temperature $T_{REF}$. The said second parameter $P_2$ is related to a calculated speed and/or a calculated road inclination over the road section ahead for the motor vehicle. Further, a (Continued)

computer program, a computer program product, a system and a motor vehicle including such a system are disclosed.

25 Claims, 5 Drawing Sheets

(51) Int. Cl.
    *B60W 10/00*     (2006.01)
    *B60W 10/10*     (2012.01)
    *F01N 3/20*     (2006.01)
    *F01N 11/00*     (2006.01)
    *F16H 59/74*     (2006.01)
    *F16H 61/02*     (2006.01)
    *F02D 41/28*     (2006.01)

(52) U.S. Cl.
    CPC .............. *F01N 3/20* (2013.01); *F01N 3/208* (2013.01); *F01N 11/002* (2013.01); *F01N 2900/1404* (2013.01); *F02D 2041/281* (2013.01); *F16H 59/74* (2013.01); *F16H 2061/0232* (2013.01); *Y02T 10/24* (2013.01)

(56) References Cited

U.S. PATENT DOCUMENTS

| | | | |
|---|---|---|---|
| 5,794,170 A * | 8/1998 | Kuroda ................... | B60T 8/172 123/350 |
| 5,997,434 A | 12/1999 | Graf et al. ...................... | 477/98 |
| 6,059,689 A | 5/2000 | Shimizu .......................... | 477/98 |
| 2004/0044457 A1 | 3/2004 | Kolmanovsky et al. | |
| 2004/0123589 A1 | 7/2004 | Ohtake et al. | |
| 2004/0204289 A1 | 10/2004 | Inoue et al. .................. | 477/107 |
| 2004/0237513 A1 | 12/2004 | Bunting et al. | |
| 2005/0166580 A1 | 8/2005 | Pfaeffle et al. | |
| 2006/0096280 A1 | 5/2006 | Zhan et al. | |
| 2006/0196285 A1 | 9/2006 | Steen et al. ..................... | 74/335 |
| 2007/0225116 A1 | 9/2007 | Berglund et al. ............. | 477/111 |
| 2008/0016856 A1 | 1/2008 | Zhang et al. | |
| 2009/0118091 A1 * | 5/2009 | Lahti ................... | B60W 30/188 477/100 |
| 2009/0143950 A1 * | 6/2009 | Hasegawa ................ | B60K 6/48 701/68 |
| 2009/0156358 A1 | 6/2009 | Shamis et al. ................ | 477/100 |
| 2009/0288398 A1 | 11/2009 | Perfetto et al. | |
| 2009/0301061 A1 | 12/2009 | Sahlen et al. | |
| 2012/0046841 A1 | 2/2012 | Wurthner et al. | |
| 2012/0059572 A1 | 3/2012 | Larsson et al. | |
| 2012/0203434 A1 | 8/2012 | Sujan et al. ..................... | 701/64 |

FOREIGN PATENT DOCUMENTS

| | | |
|---|---|---|
| FR | 2 820 462 | 8/2002 |
| GB | 2 397 539 | 7/2004 |
| JP | 2009255701 A * | 11/2009 |
| WO | WO 2005/019616 | 3/2005 |

OTHER PUBLICATIONS

International Preliminary Report on Patentability dated Dec. 23, 2014 issued in corresponding International patent application No. PCT/SE2013/051143.

International Search Report dated Jan. 24, 2014 issued in PCT International Application No. PCT/SE2013/051144.

* cited by examiner

REGULATION OF A TEMPERATURE IN AN EXHAUST AFTERTREATMENT SYSTEM

CROSS-REFERENCE TO RELATED APPLICATIONS

The present application is a 35 U.S.C. §§371 national phase conversion of PCT/SE2013/051143, filed Oct. 2, 2013, which claims priority of Swedish Patent Application No. 1251103-6, filed Oct. 2, 2012, the contents of which are incorporated by reference herein and Swedish Patent Application No. 1351151-4, filed Oct. 2, 2013, the contents of which are incorporated by reference herein. The PCT International Applications were published in the Swedish language.

TECHNICAL FIELD

The present invention pertains to a method for the regulation of a temperature in an exhaust system through control of a motor vehicle's driveline. Further, the invention pertains to a computer program, a computer program product, a system and a motor vehicle comprising such a system.

BACKGROUND OF THE INVENTION

Laws and regulations for exhaust emission from motor vehicles have been drafted in many jurisdictions because of pollution and air quality, primarily in urban areas. These laws and regulations often consist of sets of requirements which define acceptable limits for exhaust emissions (emission standards) for motor vehicles equipped with combustion engines. For example, emission levels of nitrogen oxides ($NO_x$), hydrocarbons (HC), carbon monoxide (CO) and particles are often regulated for most types of vehicles.

In order to meet such emission standards, the exhausts caused by the combustion in combustion engines are aftertreated (purified). For example, a so-called catalytic purification process may be used, which is why aftertreatment systems usually comprise a catalyst. Further, aftertreatment systems may, alternatively, or in combination with one or several catalysts comprise other components, such as one or several particulate filters.

FIG. 1 shows the combustion engine 101 of a motor vehicle 100, where the exhaust stream generated by the combustion is led via a turbocharger 220. The exhaust stream is subsequently led via a pipe 204 (indicated with arrows) to a particulate filter (Diesel Particulate Filter, DPF) 202 via a diesel oxidation catalyst (DOC) 205. Further, the aftertreatment system comprises an SCR catalyst 201 (Selective Catalytic Reduction, SRC), arranged downstream of the particulate filter 202, which uses ammonia ($NH_3$), or a composition from which ammonia may be generated/formed, as an additive for the reduction of the quantity of nitrogen oxides $NO_x$. The particulate filter 202 may, alternatively, be arranged downstream of the SCR catalyst 201. The diesel oxidation catalyst DOC 205 has several functions and uses the surplus of air which the engine process generally creates in the exhaust stream as a chemical reactor jointly with a precious metal coating in the diesel oxidation catalyst. The said diesel oxidation catalyst is normally primarily used to oxidise remaining hydrocarbons and carbon monoxide in the exhaust stream into carbon dioxide, water and heat, and conversion of nitrogen monoxide into nitrogen dioxide.

In connection with combustion of fuel in the combustion engine's combustion chamber (cylinders), soot particles are formed. For this reason, the particulate filter is used to catch soot particles and thus functions so that the exhaust stream is led through a filter structure where soot particles are caught from the passing exhaust stream and stored in the particulate filter. The particulate filter is filled with soot as the vehicle is driven, and sooner or later the filter must be emptied of soot, which is usually achieved with the help of so-called regeneration. The said regeneration entails that the soot particles (mainly carbon particles) are converted into carbon dioxide and/or carbon monoxide in one or several chemical processes. Regeneration may occur in various ways and may for example occur with the help of so-called $NO_2$-based regeneration. often also called passive regeneration, or through so-called oxygen ($O_2$)-based regeneration, also called active regeneration.

In connection with passive regeneration, nitrogen oxide and carbon oxide are formed in a reaction between carbon and nitrogen dioxide according to e.g. equation 1:

$$NO_2+C=NO+CO \tag{1}$$

The passive regeneration, however, is heavily dependent on the availability of nitrogen dioxide. If the supply of nitrogen dioxide is reduced, the regeneration speed is also reduced. The supply of nitrogen dioxide may e.g. be reduced if the formation of nitrogen dioxide is hampered, which may e.g. occur if one or several components in the aftertreatment system are contaminated by sulphur, which normally occurs in at least some types of fuel, e.g. diesel. Competing chemical reactions also hamper the nitrogen dioxide transformation.

The advantage of passive regeneration is that desired reaction speeds and thus the speed at which the filter is emptied are achieved at lower temperatures. Typically, regeneration of the particulate filter during passive regeneration occurs at temperatures in the range of 200° C. to 500° C., although temperatures in the higher part of this interval are normally preferable. Notwithstanding this, compared to the significantly lower temperature interval in active regeneration, this thus constitutes a great advantage if e.g. an SCR catalyst is present, since there is no risk that such a high temperature level is achieved that there is a risk of damage to the SCR catalyst. Nevertheless, it is important that a relatively high temperature is achieved in order for an effective passive regeneration to take place.

In the event of active regeneration, so-called oxygen ($O_2$)-based regeneration, a chemical process occurs mainly according to equation 2:

$$C+O_2=CO_2+heat \tag{2}$$

Thus, carbon plus oxygen are converted, in active regeneration. into carbon dioxide plus heat. This chemical reaction, however, is heavily temperature-dependent and requires relatively high filter temperatures in order for a significant reaction speed to arise at all. Typically, a minimum particulate filter temperature of 500° C. is required, but preferably the filter temperature should be even higher in order for regeneration to occur at the desired speed.

Often the maximum temperature which may be used in active regeneration is limited by tolerances for some of the components comprised in the aftertreatment system/exhaust system. For example, often the particulate filter 202 and/or (where applicable) a subsequent SCR catalyst have constructional limitations with regard to the maximum temperature they may be subjected to. This entails that the active regeneration may have a maximum component temperature which is often undesirably low. Simultaneously, a very high minimum temperature is required in order for any usable reaction speed to arise at all. In active regeneration, the soot load is normally essentially totally burned in the particulate filter 202. This means that a total regeneration of the particulate filter is obtained, following which the soot level in the particulate filter is essentially 0%. Today it is increasingly common for vehicles to be equipped, in addition to a particulate filter 202, with an SCR catalyst 201, which is why active regeneration may entail problems in the form of overheating for the subsequent SCR catalyst treatment process.

Depending on how a vehicle is driven, the temperature of the exhaust stream resulting from the combustion will vary. If the combustion engine works hard, the exhaust stream will maintain a higher temperature and vice versa if the load of the combustion engine is relatively low, the temperature of the exhaust stream will be significantly lower. If the vehicle is driven for a longer period of time in such a manner that the temperature of the exhaust stream maintains relatively low temperatures, such as temperatures below 150° C. to 300° C., a degradation of the function of the diesel oxidation catalyst 205 will occur because the reaction of the sulphur which is usually present in the fuel in various forms with the active coating of the diesel oxidation catalyst 205, usually comprising one or several precious metals or other applicable metals such as e.g. aluminium. At temperatures below 150° C. to 250° C., for example, an SCR catalyst will not function well. On the other hand, if the vehicle is driven for a longer period of time in such a manner that the exhaust stream's temperature maintains relatively high temperatures, this means that active regeneration may take place at the desired speed. However, the temperature in the exhaust stream may not exceed a maximum permitted temperature so that heat sensitive components in the aftertreatment system are damaged, as previously mentioned.

BRIEF DESCRIPTION OF THE INVENTION

One objective of the present invention is to provide a solution which wholly or partly resolves problems and/or disadvantages with solutions for the regulation of a temperature in an exhaust system according to prior art.

According to a first aspect of the invention, the said objective is achieved with a method for the regulation of a temperature in an exhaust system in a motor vehicle through control of its driveline. That motor vehicle comprises: a driveline comprising a combustion engine which may be connected to a gearbox via a clutch device, and an exhaust system arranged for the removal of an exhaust stream from the combustion engine; where the method comprises the step:

control of the driveline for activation or deactivation of coasting of the vehicle based on one or several first parameters $P_1$ and on one or several second parameters $P_2$ for the regulation of a temperature $T_{Ex}$ in the exhaust system; where
at least one of the one or several first parameters $P_1$ is a first temperature difference between a first temperature $T_1$ in the said exhaust system and a reference temperature $T_{Ref}$; and
the said second parameter $P_2$ is related to a calculated speed and/or a calculated road inclination over the road section ahead for the said motor vehicle.

Different embodiments of the above method are disclosed. One method according to the invention may also be implemented in a computer program, which when executed in a computer achieves that the computer carries out the method according to the invention.

According to a second aspect of the invention, the above objective is achieved with a system arranged for the control of one or several functions in a motor vehicle. That motor vehicle comprises: a driveline comprising a combustion engine which may be connected to a gearbox via a clutch device, and an exhaust system arranged for the removal of an exhaust stream from the said combustion engine; where the said system comprises a control device arranged to control the driveline for activation or deactivation of coasting of the vehicle based on one or several first parameters $P_1$ and one or several second parameters $P_2$ for the regulation of a temperature $T_{Ex}$ in the said exhaust system, where
at least one of the one or several first parameters $P_1$ is a first temperature difference between a first temperature $T_1$ in the said exhaust system and a reference temperature $T_{Ref}$, and
the said second parameter $P_2$ is related to a calculated speed and/or a calculated road inclination over the road section ahead for the motor vehicle.

The above mentioned system is preferably arranged in a motor vehicle, such as a bus, a truck or another similar motor vehicle.

With a method or a system according to the present invention, an improved solution for the regulation/control of a temperature in an exhaust stream in a motor vehicle is obtained. For example, the invention facilitates the regulation of the temperature in such operational cases where the regulation of the temperature has not been possible or sufficient with solutions according to prior art. This applies in particular to the operational cases where the engine has a low load or at low outdoor temperatures. An example of a low load on the engine is e.g. on dragging (engine braking) of the vehicle when air is pumped through the exhaust system.

With temperature regulation according to the present invention, it is possible for components in the exhaust system, such as particulate filters and catalysts, to work efficiently since the temperature in the exhaust system may be adapted quickly and with high precision to the components' optimal operating temperature. The risk for components in the exhaust system to be damaged due to overheating is thus also reduced.

Further, the invention provides a more fuel efficient method of reaching a desired temperature or of maintaining/keeping a current temperature in the exhaust system compared to prior art. With regulation of the temperature through control of the driveline with one or several first parameters $P_1$ and one or several second parameters $P_2$, measures for example entailing a large fuel consumption may be avoided, such as activation of an external heater or engine regulation aimed at increasing the exhaust temperature by reducing the efficiency of the engine.

Another advantage of the invention is that it is not necessary to equip the vehicle with further parts/components in order to achieve the advantages of the invention since already existing parts/components in the vehicle may be used, which entails a cost saving.

Further advantages and embodiments of the invention are set out in the following detailed description.

BRIEF DESCRIPTION OF FIGURES

The present invention is described with reference to the enclosed figures where.

DETAILED DESCRIPTION OF AN EMBODIMENT

Figure 2:
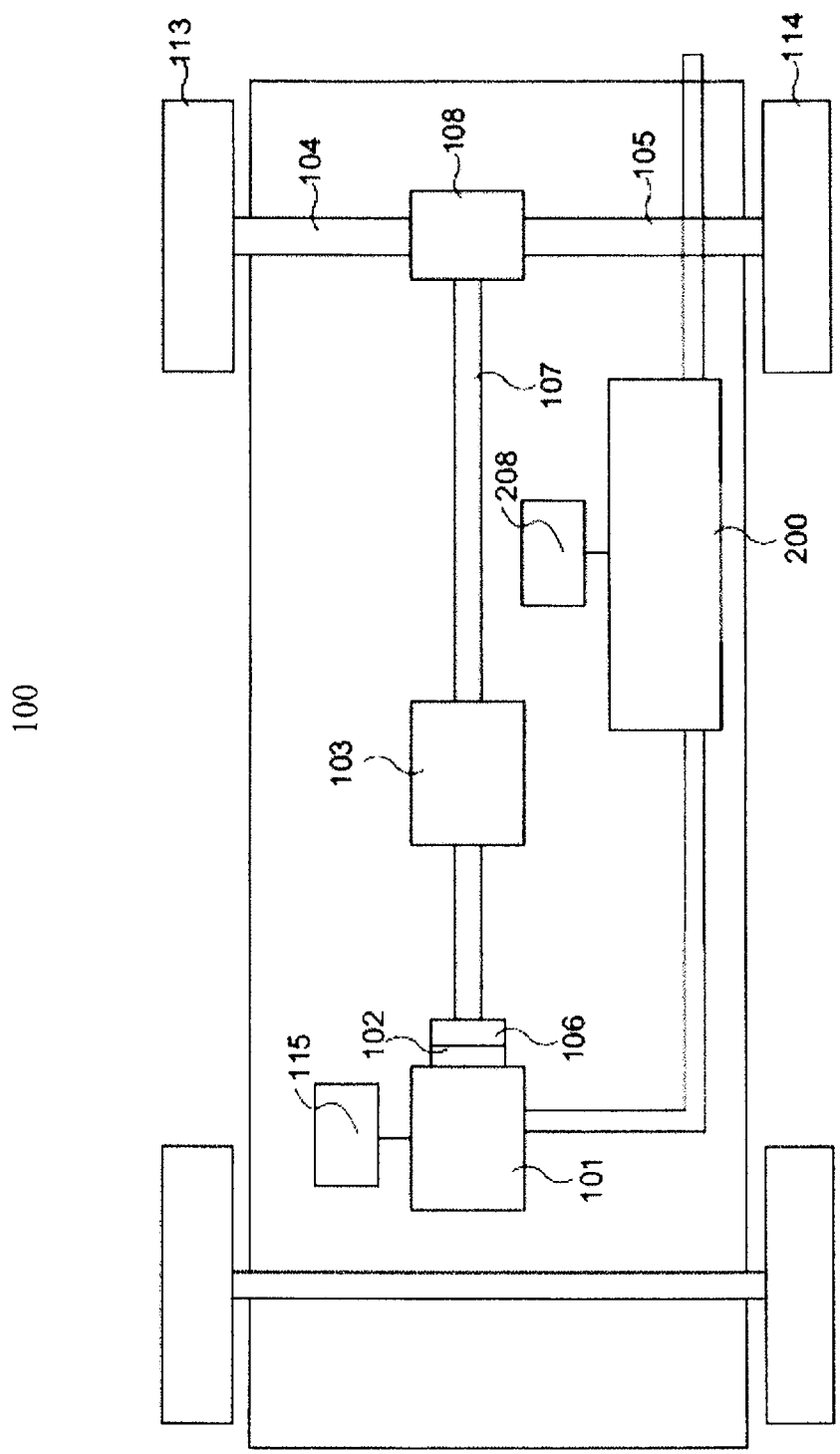
FIG. 2 is a schematic diagram of an example vehicle.

FIG. 2 is a schematic diagram of a motor vehicle 100, such as a truck, bus or other similar motor vehicle. The vehicle 100 schematically shown in FIG. 2 comprises a pair of front wheels 111, 112 and a pair of rear wheels with driving wheels 113, 114. The vehicle also comprises a driveline with a combustion engine 101 (e.g. a diesel engine), which via an output shaft 102 on the combustion engine is connected to a gearbox 103, for example via a clutch device 106.

The clutch device may consist of an automatically controlled clutch and be controlled by the vehicle's control system via a control device 115, 208, which may also control the gearbox 103. An output shaft 107 from the gearbox 103 drives the driving wheels 113, 114 via a final drive 108, such as a differential, and drive shafts 104, 105 connected to the said final drive 108.

Figure 1:
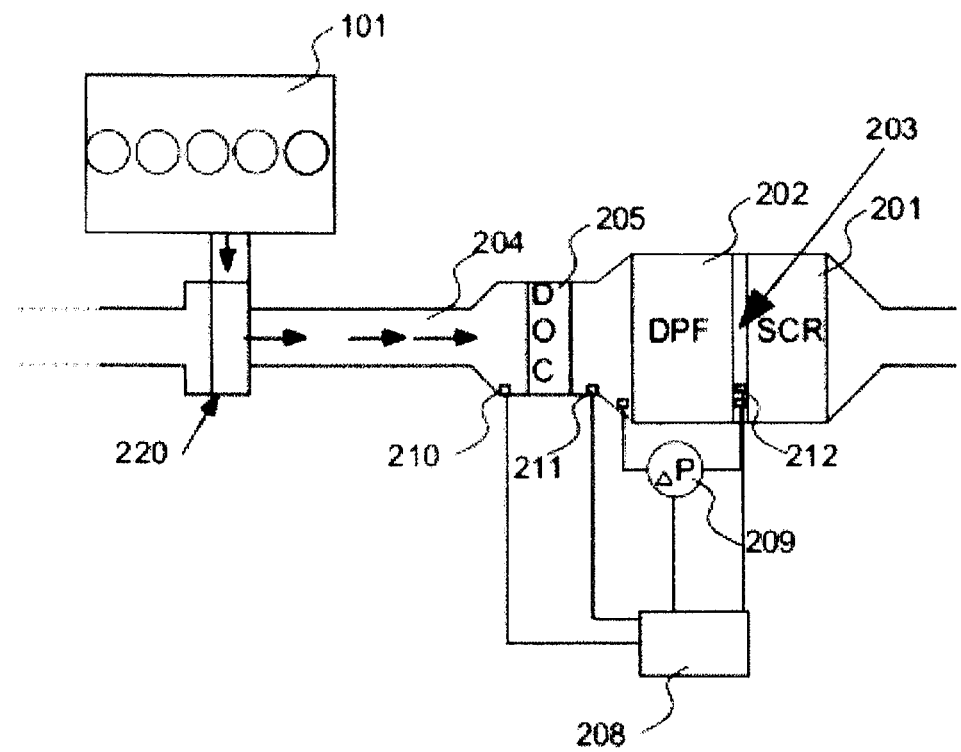
FIG. 1 is a schematic diagram of a system comprising a combustion engine and an exhaust system.

The vehicle 100 also has an exhaust system arranged to remove an exhaust stream generated by the combustion engine 101 on a combustion in the same. As showed in FIG. 1, the exhaust system may comprise an aftertreatment system (exhaust purification system) for the treatment (purification) of exhaust emissions from the combustion engine 101. However, it is not necessary for the exhaust system to comprise such an aftertreatment system, and in addition the exhaust system may comprise other parts/components, such as a turbo, a silencer system, and gas flow systems for EGR.

The gearbox 103 is usually a manual gearbox; an automatic gearbox, such as an automatic gearbox, automatic manual gearbox (Automatic Manual Transmission, AMT) or double clutch gearbox (Double Clutch Transmission, DCT); or a continuous variable gearbox (Continuous Variable Transmission/Infinitely Variable Transmission, CVT/IVT).

A manual gearbox 103 is a gearbox with a number of discrete gears and is arranged to be manoeuvred by the driver for engagement or disengagement of gears (e.g. forward and reverse gears).

An automatic gearbox also has a number of gears, i.e. it comprises several discrete gears. However, it differs from a manual gearbox in that it is controlled/manoeuvred by a control system comprising one or several control devices, also called ECUs (Electronic Control Unit). The control device or ECU is arranged to control the gearbox 103, for example when shifting from gear selection at a certain speed with a certain running resistance. Also, the ECU may measure the speed and torque of the engine 101 and the condition of the gearbox. Information from the engine or the gearbox may be sent to the ECU in the form of electric communications signals via, for example, a so-called CAN (Controller Area Network) bus installed in the motor vehicle 100.

The gearbox 103 has been illustrated schematically as one device. However, it should be noted that the gearbox may also physically consist of several cooperating gearboxes, for example a so-called range gearbox, a main gearbox and a split gearbox, which are arranged along the vehicle's driveline. Gearboxes according to the above may comprise any number of suitable discrete gears. Today's gearboxes for heavy goods vehicles usually have twelve forward gears, two reverse gears and one neutral gear.

A continuously variable gearbox, also called a CVT gearbox or IVT gearbox, is another type of well known gearbox which differs from the previous gearbox types, since it does not have a number of discrete gears corresponding to different gearings but instead has a continuously variable gearing. In this type of gearbox, gearing may thus within certain limits be controlled to the exact gearing desired.

In relation to upshifts and downshifts, an upshift means that a higher possible gear in the gearbox is selected while a downshift means that a lower possible gear in the gearbox is selected. This applies to gearboxes with several discrete gears. For continuously variable gearboxes, "fictitious" gear steps may be defined and the shifting gears may occur in the same manner as for a gearbox with discrete gear steps. However, the usual way of controlling such a continuously variable gearbox is to let the gearing vary depending on other relevant parameters. The control of such a gearbox is usually integrated with the control of the combustion engine's speed and torque, i.e. its operating point. A common method is to let control of the continuously variable gearbox be based on a current driving power requirement, e.g. calculated based on a gas pedal position and a speed for the vehicle, and which operating point gives the best effect in order to achieve the said driving power requirement. Gearing in the continuously variable gearbox thus becomes a result of which engine speed leads to the optimal operating point for the current driving power requirement. Aspects other than efficiency may also be taken into account in the choice of operating point for the engine. These may be e.g. driveability-related aspects, such as torque response times, i.e. how long it would take to achieve a higher driving wheel torque, or how much torque may be obtained during a certain time period.

One method according to the present invention for the regulation of a temperature in the exhaust system comprises the steps: control of a driveline for the activation or deactivation of coasting based on one or several first parameters $P_1$ and one or several second parameters $P_2$ for the regulation of a temperature $T_{Ex}$ in an exhaust system; where at least one of the one or several first parameters $P_1$ is a first temperature difference between a first temperature $T_1$ in the exhaust system and a reference temperature $T_{Ref}$, and the second parameter $P_2$ is related to a calculated speed and/or a calculated road inclination over road sections ahead of the motor vehicle. The reference temperature $T_{Ref}$ is, according to one embodiment of the invention, a desired temperature, i.e. a so-called setpoint temperature.

Activation of coasting entails that the vehicle's engine 101 is mechanically disconnected from the vehicle's driving wheels 110, 111, i.e. that the driveline is opened, while deactivation of coasting entails that the driveline is closed. Disconnection of the driving wheels from the engine may, for example, be achieved by putting the gearbox 103 in a neutral gear, or by opening the clutch device 106. In other words, essentially no power is transmitted through the gearbox from the engine to the driving wheels during coasting.

Control of a driveline for activation or deactivation of coasting means that a control system controls the driveline for this purpose, or alternatively, that a driver of the vehicle activates/deactivates coasting guided by a presentation/indication system. The said presentation/indication system is arranged to present/indicate to the driver when it is suitable to activate/deactivate coasting according to the previous algorithm for control of the driveline. Thus the presentation/indication system entails a driver support for the driver ("driver support") while driving the vehicle. The presentation may, for example, involve visual, audio or tactile presentation/indication or combinations thereof with suitable arrangements for this purpose. Activation/deactivation of coasting may take place with a suitable control device which is manouverable by the driver, such as a control button, a joystick, a control pad, a foot switch, etc.

The one or several first $P_1$ and second parameters $P_2$ are preferably used as in-parameters for a control algorithm arranged to control the temperature in the exhaust system at a desired value through control of the driveline (e.g. gearbox and clutch). The control algorithm may be of many different types and may be an algorithm which only looks at the first and second parameters and uses one or several threshold values (e.g. one higher and one lower threshold value) to determine which control measure should be taken. More advanced algorithms use additional parameters as described below.

With the use of one or several first parameters $P_1$ and second parameters $P_2$ for the regulation of a temperature $T_{Ex}$ in an exhaust system through control of the driveline, the possibility of maintaining the temperature in e.g. the catalyst at a desired level is obtained, which thus guarantees certain emission levels from the vehicle. This may also be a fuel effective manner of controlling the temperature compared to other measures. such as deteriorating the combustion efficiency in the engine. Further, the invention entails that good driveability may be obtained since the second parameter is also used in controlling the driveline.

Preferred temperature intervals against which the temperature in the exhaust system is regulated according to one embodiment are for example temperatures above 200° C. to 250° C. for a good $NO_x$ conversion in SCR catalysts depending on the flow and SCR volume since a high flow and a low volume requires higher temperatures. For an efficient passive regeneration, the temperature must be above 250° C. to 350° C. depending on the $NO_x$/PM quota (Particulate Matter) where a higher quota requires lower temperatures. However, the temperature in the exhaust system should preferably be maintained lower than 550° C. to 600° C. in order to avoid damaging components in the exhaust system.

Numerous different first parameters $P_1$ may be combined to control the driveline according to the invention, and thus according to one embodiment of the invention the one or several first parameters $P_1$ also chosen from among the group comprising:
  a first temperature $T_1$ which may be a temperature in an area of the exhaust stream or a surface, liquid or substrate temperature in any part or component of the exhaust system such as a particulate filter, catalyst, silencer, sensor, etc.; and
  a second temperature difference between the first temperature $T_1$ and a second temperature $T_2$ in the exhaust system. The second temperature $T_2$ is another temperature in the exhaust system than the first temperature $T_1$. However, this temperature $T_2$ may be a temperature in an area of the exhaust stream or a surface, liquid or substrate temperature in any part or component of the exhaust system such as a particulate filter, catalyst, silencer, sensor, etc.

According to another embodiment of the invention, the said reference temperature $T_{Ref}$ is any of a temperature in a component in the said exhaust system, such as a temperature of a wall on an exhaust component; a temperature of a liquid injected in the said exhaust system, such as the temperature of injected urea, petrol or diesel; or a temperature in a component installed in connection with the said exhaust system, such as control devices, different types of sensors/givers and actuators. This is in order to obtain a good function of the components or processes and/or to avoid damaging the comprised or connected parts and components. According to another embodiment of the invention, a time derivative and/or a time integral of the first temperature difference and/or the second temperature difference is used. The use of a time derivative is advantageous if the control system is to react quickly to a temperature change while the use of a time integral instead entails that the control system takes into consideration long term trends in the temperature change which is advantageous for long term control of the temperature in the exhaust stream.

The above mentioned current temperature and temperature differences and functions thereof may be based on sensor values obtained from one or several sensors arranged at, in connection with or inside the exhaust system. Signals from sensors may be sent over, for example, a communications bus or a wireless link to one or several control devices for signal processing. The temperature differences and functions thereof may also be based on so-called virtual sensors, i.e. sensor values which are calculated from other real sensor signals with the use of one or several sensor models, which provides so-called current values. The advantage of using current temperatures values and temperature differences and functions thereof is that these may be used directly for the determination of the first parameter $P_1$ without complex or resource demanding calculations with the use of various simulation models. Thus these current values may also be obtained quickly.

Further, it is realised that the one or several first parameters $P_1$ may be calculated (predicted) values, e.g. selected from among the group comprising: a calculated first temperature $T_1$ which may be a calculated temperature in an area of the exhaust stream or a surface, liquid or substrate temperature in any part or component of the exhaust system such as a particulate filter, catalyst, silencer, sensor, etc.; a first calculated temperature difference between the first temperature $T_1$ and a reference temperature $T_{Ref}$ in the exhaust system; a second calculated temperature difference between the first temperature $T_1$ and a second temperature $T_2$ in the exhaust system. The second calculated temperature $T_2$ is another temperature in the exhaust system than the first calculated temperature $T_1$. However, the second calculated temperature $T_2$ may also be a temperature in an area of the exhaust stream or a surface, liquid or substrate temperature in any part or component of the exhaust system such as a particulate filter, a catalyst, silencer, sensor etc.; and a time derivative and/or a time integral of the calculated first temperature $T_1$, or the first calculated temperature difference, or the second calculated temperature difference. The advantages of using time derivatives or time integrals of predicted values are the same as when using time derivatives and time integrals of current values.

By using one or several first calculated parameters $P_1$, information is obtained about how the relevant parameters will vary over time, which means that the system for the regulation of the temperature in the exhaust system may be controlled so that the desired temperatures may be obtained in the best possible manner in the future. This applies in particular to slow systems in which a temperature takes a long time to change, e.g. catalysts or other components, which require early measures for the avoidance of overshoots in the regulation of a temperature. The same advantages apply to calculated speed or road inclination.

Calculated parameters means that they are calculated or simulated in advance based on (mathematical) models of the vehicle and/or the components comprised in the vehicle. Based on one or several calculated first $P_1$ and second $P_2$ parameters, a control strategy for control of the driveline, in order to regulate the temperature in the exhaust system, may be selected among several different possible control strategies. By calculating/simulating how the parameters will vary over the road sections lying ahead for the vehicle according to one or several different control strategies, the control strategy which achieves certain requirements, e.g. that the temperature remains within a predefined limit value while being optimal from another perspective, such as fuel consumption, may be selected. The above therefore entails that the one or several first $P_1$ and second parameters $P_2$ may also be calculated based on one or several different future control strategies for the gearbox. This embodiment thus pertains to a feedback method where calculated parameters are used for further calculation of one or several control strategies based on one or several possible operating points, i.e. operating points which may possibly be used having regard to other requirements, such as driveability or fuel consumption. The said one or several control strategies are subsequently used in order to calculate new one or several first and/or second parameters or in order to update the existing parameters. Further, it should be noted that even if only one control strategy is calculated, information derived from this single control strategy may be used by the control system in order to determine whether it may reasonably be used, or whether it is better to let the vehicle be driven with the current operating point for the control of the driveline.

As mentioned above, the inventors have thus realised that the one or several first parameters $P_1$ are calculated over a road section ahead of the vehicle, for example by simulation over the road section ahead. According to this embodiment, the calculated first parameters $P_1$ may be determined based on one or several vehicle-specific and/or road-specific data for the vehicle. These may preferably be selected from the group comprising: inclination of the road ahead of the vehicle, curve radii of the road section ahead, speed limits of the road section ahead; motor vehicle weight; rolling resistance of the motor vehicle; air resistance of the motor vehicle; engine-specific data such as maximum output, minimum output, maximum torque, minimum torque, exhaust flow, exhaust gas recirculation content and lambda values (i.e. air/fuel mixture); and installation specific data such as the possible accumulation of substances and/or release of substances and/or conversion of substances in the exhaust system and a surface in the exhaust system in contact with the exhaust stream. Further, driver-interactive data which is related to the driver's driving style may be used in connection with the prediction of the one or several first parameters $P_1$, so that the vehicle's future behaviour is taken into account when the prediction is made. Examples of driver-interactive data include: the use of blinkers, gas pedal position, and use of brakes.

One advantage with the use of vehicle-specific and/or road-specific data for control is that the system may determine in advance whether any control strategy for one or several functions (e.g. gearing, external load, external heater, regulations of flow, etc.) needs to be used to avoid that the temperature ends up outside a preferred temperature range. Thus, the use of unnecessary control strategies is avoided and also the system may act proactively in the event any measure should be required, i.e. the system may act in advance.

According to one special embodiment, the first temperature $T_1$ is a temperature in the exhaust stream and the second temperature $T_2$ is a surface, liquid or substrate temperature in the exhaust system. A surface temperature is a temperature on a surface of the exhaust system or a part thereof, which impacts the heat conductivity (losses) from the exhausts and the heating of components in the exhaust system. Liquid temperature means the temperature in a liquid present in the exhaust system, such as urea or water. This temperature impacts the heat conductivity to the liquid and thus the evaporation of the same. The latter temperature, the substrate temperature, means the temperature in a material in e.g. a catalyst, a particulate filter, or in a NO trap. The substrate temperature impacts the heat conductivity to the exhaust treatment system and the exhaust treatment system's function (i.e. the physical and chemical processes). The first $T_1$ and the second $T_2$ temperature may be a current or a calculated first $T_1$ or second $T_2$ temperature.

Further, it should be understood that the one or first parameters $P_1$ used in the control of the driveline may consist of only current values, or consist of only calculated values, or be a combination of current and calculated values depending on the application.

Activation or deactivation of coasting may according to one embodiment of the invention take place with the use of one or several threshold values against which the one or several first parameters $P_1$ and/or second parameters $P_2$ are compared. The threshold values usually specify limit values which must not be undershot or exceeded, and if the temperature passes such a threshold value a temperature regulating measure is taken by the system. If temperature increasing or temperature maintaining measures need to be taken, coasting is activated if a value for at least one of the one or several first parameters $P_1$ or second parameters $P_2$ is below a threshold value $P_T$, according to one embodiment of the invention.

The second parameter $P_2$ relates to a calculated speed and/or a calculated road inclination for the said motor vehicle over the road section ahead as mentioned above. Coasting in other situations than when the vehicle may maintain, or essentially maintain, a desired speed results in very poor driveability and is therefore not desirable. It should be realised that the one or several first parameters $P_1$ are not alone in determining whether coasting should be activated according to the invention. Usually the most important condition is that the vehicle must be able to maintain a desired speed with coasting activated since driveability is otherwise too poor. Other conditions are also relevant, which means that real systems use the temperature in the exhaust steam as one of several parameters when deciding whether or not coasting should be activated. Deactivation of coasting may, however, be carried out independently of the vehicle's speed, the road inclination, etc.

A coasting algorithm according to one embodiment of the invention may have the following in-parameters: road inclination, vehicle weight, rolling resistance, air resistance, set speed (i.e. desired speed), brake speed (dhsc speed). Based on these parameters, the system calculates the duration for which the vehicle may coast before the vehicle reaches a too low speed, for example; coasting is activated if the duration exceeds a time threshold value. The present invention may, for example, be implemented so that the coasting duration is dependent on or impacted by the temperature in the exhaust system. If the temperature in the exhaust system takes on a value above a threshold value the system requires longer durations (i.e. more difficult to coast), and if the temperature is below the threshold, then the system reduces the duration requirement (i.e. easier and more frequent coasting). It is also conceivable that the temperature parameter may control the speed limits which the coasting algorithm uses. If it is cold in the exhaust system, the system may, for example, tolerate that the vehicle loses more speed while coasting, and thus the coasting algorithm becomes more active, i.e. coasting is more frequent, all other things being equal.

Other additional parameters which are useful in the control of the driveline for activation or deactivation of coasting in regulating the temperature in the exhaust system is a requested engine power, since coasting is activated when the requested engine or propulsion power is low. Otherwise the driving experience/driveability becomes too poor, and a requested engine torque in analogy with the above reasoning.

When controlling the exhaust flow with the one or several first parameters, measures may be taken to control the engine when the decoupling is activated for quicker and more precise temperature regulation in the exhaust system. In order to achieve the desired objective, the engine must be controlled according to the following principles: increased engine speed, and thus increased exhaust flow, if the temperature $T_{Ex}$ in the exhaust system is to be reduced; and reduction of the engine speed, and thus a reduction of the exhaust flow, if the temperature is to be increased or maintained. In some systems the engine may be controlled all the way down to zero (0) in engine speed (i.e. engine switched off), which means that the flow is reduced to a minimum. In other systems the engine may not be switched off entirely, instead the lowest speed is limited to the engine's idling speed (e.g. 500 rpm). This embodiment may be realised by increasing the gearing if a value for the one or several first parameters $P_1$ exceeds a first threshold value, and the gearing is instead reduced if a value for the one or several first parameters $P_1$ is below a second threshold value. The first and second threshold values may assume, or be dependent on, a value within, or in the vicinity of the temperature range which was previously discussed, i.e. above 200° C. to 250° C. for $NO_x$ conversion; above 250° C. to 350° C. for passive regeneration; and below 550° C. to 600° C. to avoid damaging components in the exhaust system.

The inventors have also realised that the one or several first parameters $P_1$ are suitable for the control of other functions in the vehicle for the regulation of the temperature $T_{Ex}$ at the same time as coasting is activated. These functions must have a direct or indirect impact on the temperature in the exhaust system $T_{Ex}$. Thus, the regulation of the temperature in the exhaust system $T_{Ex}$ may be more efficient and quicker. Suitable functions are related to: external load; conversion of exhaust heat into energy; external heating of the exhaust system; injection of fuel into the engine; and regulation of the exhaust flow. It should be realised that the one or several first parameters $P_1$ may be used to control such a function or a combination of two or several such functions.

Examples of external load which may be controlled with the one or several first parameters $P_1$ when coasting is activated are auxiliaries such as a water pump, fan or compressor; generator; hybrid generator or similar energy recycling system; retarder, exhaust brake or other auxiliary brakes. According to the invention, the external load must be arranged on the engine side of the clutch device/gearbox since all loads which are located on the output side of the gearbox will not be able to impact the engine when coasting is activated since the driveline is open.

In coasting, the operating point in the engine may be selected freely with respect to the engine speed. while the system is normally limited to idling load with respect to engine torque. However, with an external load, the engine's torque may be impacted and thus the freedom in selecting an operating point when coasting may be further increased. In some cases, the external load is of the "on" or "off" type, i.e. it is either activated or not, and in these cases the control and calculation of the operating point is limited to determining whether or not the external load should be activated. If the temperature $T_{Ex}$ in the exhaust system is to be increased, the external load must be increased according to one embodiment of the invention, which is suitable if the temperature in the exhaust system is too low so that particulate filters and catalysts work at too low temperatures.

The one or several first parameters $P_1$ may be used for the control of an external system arranged for conversion of exhaust heat into energy (Waste Heat Recovery, WHR). The regulation of the temperature with the external system for the conversion of exhaust heat into energy takes place according to one embodiment by the maximum energy in relation to the input energy, or total converted energy being taken out via the external system. This regulation is preferably aimed at maximising the heat conduction into the external system and is designed for example as a PID or MPC regulator (Proportional Integral Derivative, PID; Model Predictive Control, MPC).

According to another embodiment of the invention. the external system for conversion of exhaust heat into energy is installed upstream in the exhaust system in relation to an area in which a certain temperature is desired to be obtained. When the external system is installed according to this embodiment it is controlled so that the external system acts in a normal mode if the temperature $T_{Ex}$ in the exhaust system is to be reduced, and in an opposite mode if the temperature in the exhaust system $T_{Ex}$ is to be increased. Normal mode means that the external system uses waste energy, e.g. heat from the exhausts, in order to generate electric or mechanic energy (and sometimes chemical energy). Where the external system operates in the opposite (reverse) mode, this means that the external system is instead supplied with energy in order to increase the temperature of the exhausts.

Further, the one or several first parameters $P_1$ may be used for the control of at least one external heater for the exhaust system. The external heater's task is to increase the temperature in the exhaust flow or any part/component in the exhaust system. Preferably, the external heater is:

a burner installed in the exhaust system after the combustion engine's cylinders;

a system arranged for the injection of hydrocarbons for oxidation or combustion on a catalyst placed in the exhaust system;

an electric heater installed in the exhaust system after the combustion engine's cylinders; or any other suitable external heater installed in, or in close connection with the exhaust system.

The external heater is preferably controlled so that a maximum temperature increase is obtained in relation to the input energy or so that the temperature increase is maximised.

However, the external heater may instead be controlled so that the temperature increase speed is prioritised. The control of the external heater may be configured as a PID or MPC regulator.

As mentioned above, the one or several first parameters $P_1$ may also be used to control a fuel injection system arranged for the injection of fuel to the combustion engine. This may occur through control of the number of post-injections, the time (CAD) for the post-injections, the pressure of the post-injections, and the fuel amount per post-injection. The control of the fuel injection system may be implemented as pre-controlled or feedback control with e.g. MAP (matrix based regulation structure), PID or MPC. As a setpoint for this control, a temperature which is downstream of the engine as well as a component in the exhaust system, e.g. a diesel oxidation catalyst (DOC) or temperature difference over the said component in the exhaust system, may be used. According to one embodiment, the control of fuel injection compensates for the efficiency (in the DOC) in the transition between chemical energy tied in the fuel to heat energy emitted by the exhausts.

Another factor impacting the temperature in the exhaust system $T_{EX}$ is the characteristics for the exhaust flow in the exhaust stream. For this reason, the one or several first parameters $P_1$ may also be used for the control of the exhaust flow, or one of the exhaust flows depending on the parameter, such as heat transfer coefficients.

Figure 3:
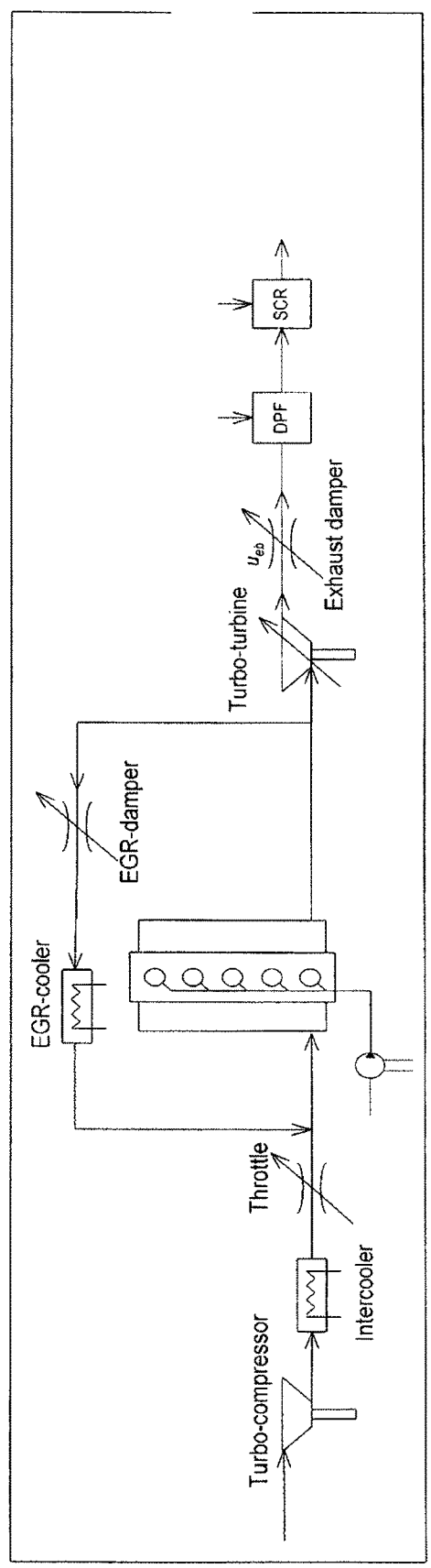
FIG. 3 is a schematic diagram of a gas flow in an engine system.

Control of the exhaust flow may for example occur through control of a gas flow system for exhaust gas recirculation (EGR) and/or through control of an intake system for the engine. FIG. 3 shows schematically a general gas flow in an engine system, where the engine system in this example comprises a diesel engine with a turbo and a number of pipes connected to the engine. Air is sucked in from the left in FIG. 3 with an intake system for the engine. The air which is sucked in passes through an intake pipe and is compressed in a turbocharger in order to be cooled subsequently by an intercooler before it passes, in certain cases, a throttle butterfly that regulates the amount of air into the diesel engine. The air is then mixed with recirculated exhausts with a gas flow system for exhaust gas recirculation (EGR) and this mixture is then sucked into the engine's cylinders in order to be mixed with diesel or another fuel before combustion occurs in the engine.

The exhausts from the combustion process then pass through a turbo turbine which sets the turbocharger into motion. Parts of the exhausts, however, enter into an EGR pipe and are led back to the intake pipe via an EGR damper and one or several EGR coolers. The EGR damper's function is to regulate the amount of recirculated exhausts back to the combustion process. When the EGR gases are cooled, the use of EGR will move heat energy from the exhausts to the engine's cooling system. Before the exhausts disappear entirely from the engine system, in some engines they pass through an exhaust damper (if installed) which controls the pressure in an exhaust collector (not shown in the figure). Subsequently, the exhausts pass through an aftertreatment system which may contain a diesel particulate filter and/or an SCR catalyst as mentioned previously. If the engine 101 is not heavily loaded, the exhausts will have a lower temperature than desired and thus cool the catalyst. One way of limiting the amount of cooling exhausts is to use a damper arranged in an intake pipe for air to the engine. Thus, the amount of air entering the engine may be limited. which in turn means the exhausts exiting the engine are also limited, which, with a given load, results in warmer exhausts. This damper is usually called a throttle butterfly. as mentioned above. The amount of air which the engine consumes is determined to a large extent by the speed of the engine, which in this case means that: the higher the engine speed, the more air flow is required to the engine.

According to the present invention, the one or several parameters $P_1$ may be used to control the gas flow system for exhaust gas recirculation (EGR) and/or the air intake system arranged for the regulation of an air flow to the engine. In addition, the control of the gas flow system for exhaust gas recirculation (EGR) and the intake system may be controlled with additional parameters related to a transferred output to a component installed in the said exhaust system and/or emissions produced by the said combustion engine. Emissions in this context mean, for example, exhausts and noise. Further, a reduction of the exhaust flow may be combined with an increase of the engine load to increase the temperature in the exhaust system. This embodiment may be realised with, for example, a pre-controlled or feedback control of an exhaust brake with the use of: a setpoint value for the temperature or a value which is a function of the said setpoint value for the temperature; or a setpoint value for the energy content of the exhausts or with a value as a function of the said setpoint value for energy content.

Figure 5:
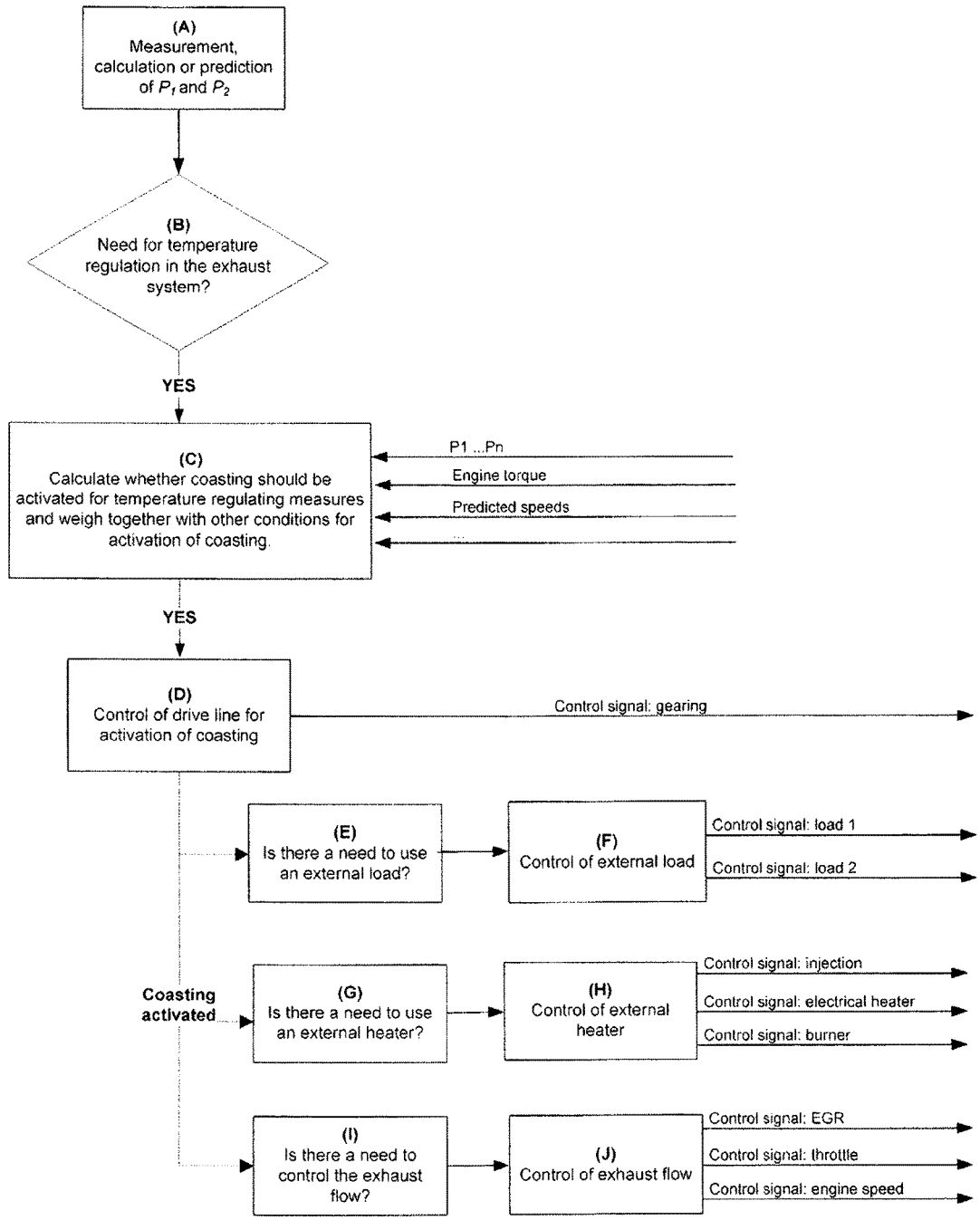
FIG. 5 is a flow diagram of an embodiment of the invention.

Further FIG. 5 shows a flow diagram of an exemplified embodiment of the method according to the invention:

A. At A, the first parameter $P_1$ from other sensor signals (virtual sensor) is measured or calculated. The first parameter $P_1$ may also be calculated over the road section ahead for the vehicle at A. Likewise, the second parameter $P_2$ is calculated at A.

B. Based on the value for the first parameter $P_1$ and the second parameter $P_2$, it is decided at B whether a temperature regulating measure needs to be taken. This may, for example, take place by a comparison of the first parameter $P_1$ and/or the second parameter $P_2$ with one or several threshold values, or by comparing several calculations of the first and second parameters with related control strategies, and based on these selecting which temperature regulations measure(s) that need(s) to be taken.

C. If a temperature measure is to be taken, it is calculated at C whether coasting is to be activated. Other parameters may also be taken into consideration in the calculation of whether or not coasting should be activated, such as requested engine power, requested engine torque, predicted speed, predicted road inclination, etc. As described above, other conditions for the activation of coasting should also be taken into consideration.

D. At D, the driveline is controlled so that coasting is activated, for example by engaging the gearbox in a neutral position, or by opening the clutch device.

E. At E, a check as to whether an external load needs to be used to regulate the temperature in the exhaust system is carried out.

F. If an external load needs to be used, the external load is controlled at F so that the desired engine load is achieved.

G. At E. a check as to whether an external heater needs to be used to regulate the temperature in the exhaust system is carried out.

H. If an external heater needs to be used, one or several external heaters are controlled at H, so that the desired temperature is achieved in the exhaust stream, for example by control of a burner, injection of hydrocarbons in the exhausts or an electric heater.

I. At I, a check as to whether the exhaust flow needs to be controlled in order to regulate the temperature in the exhaust system is carried out.

J. If the exhaust flow needs to controlled for the regulation of the temperature in the exhaust stream, the exhaust flow is controlled at J so that the desired exhaust flow is achieved, and indirectly makes it possible for the desired temperature to be achieved in the exhaust stream.

The present invention may also be implemented in a control system arranged to control all or parts of a driveline in a motor vehicle 100. Further, the system may comprise additional control devices arranged to control other functions such as external loads, external heaters, etc. Control devices of the type displayed are normally arranged to receive sensor signals from different parts of the vehicle as well as from other control devices. These control devices are also usually arranged to emit control signals to different vehicle parts and vehicle components. The control devices may also comprise, or be connected to, a calculation device arranged for the calculation/simulation of predicted parameter values.

Generally, control systems in modern vehicles consist of a communications bus system consisting of one or several communications buses for the connection of a number of electronic control devices (ECUs) or controllers 115, 208 and different components arranged on the vehicle. Such a control system may comprise a large number of control devices, and the responsibility for a specific function in the vehicle may be distributed among one or more control devices.

The control usually takes place with programmed instructions. These programmed instructions typically consist of a computer program, which, when it is executed in a computer or control device, causes the computer/control device to carry out the desired control, such as methods according to the present invention. The computer program usually consists of a computer program product, where the computer program product comprises an applicable storage medium 121 with the computer program 109 stored on the said storage medium 121. The said digital storage medium 121 may e.g. consist of any from the following group: ROM (Read-Only Memory), PROM (Programmable Read-Only Memory), EPROM (Erasable PROM), Flash, EEPROM (Electrically Erasable PROM), a hard disk unit, etc., and may be set up in or in combination with the control device, where the computer program is executed by the control device.

Figure 4:
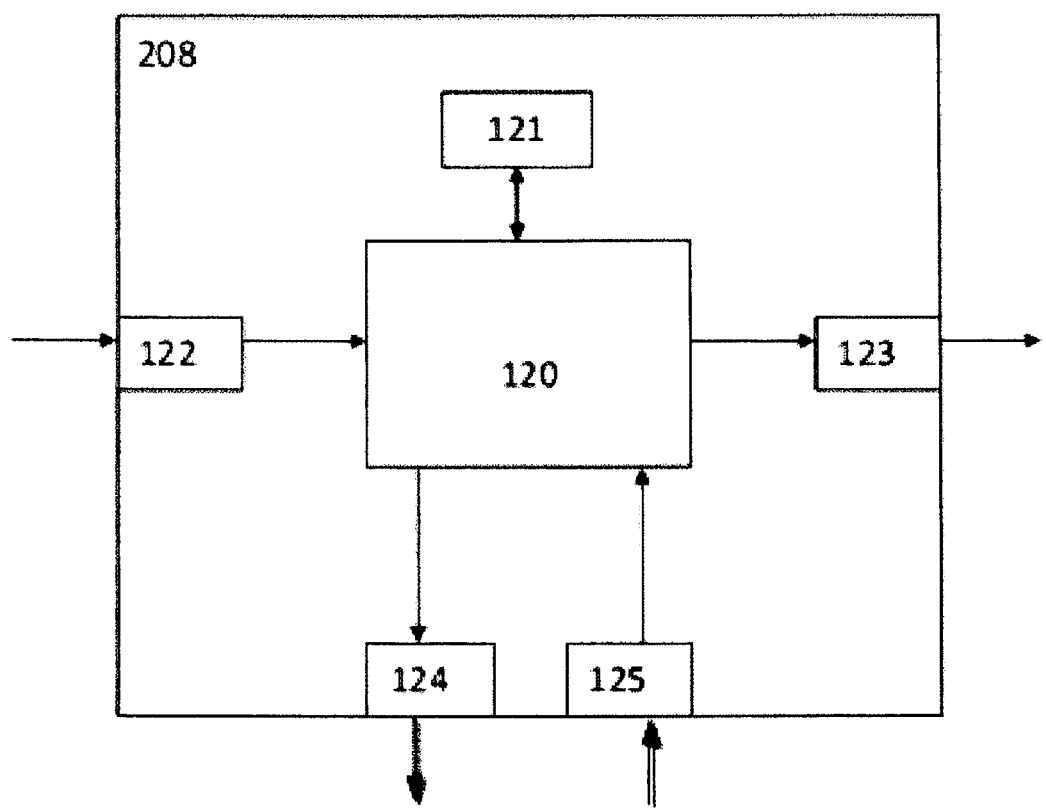
FIG. 4 is a schematic diagram of a control device.

An example control device (control device 208) is displayed in the diagram in FIG. 4, and the control device in turn may comprise a calculation device 120, which may consist of e.g. a suitable type of processor or microcomputer, e.g. a circuit for digital signal processing (Digital Signal Processor, DSP), or a circuit with a predetermined specific function (Application Specific Integrated Circuit, ASIC). The calculation device 120 is connected to a memory device 121, which provides the calculation device with e.g. the stored program code 109 and/or the stored data which the calculation device needs in order to be able to carry out calculations. The calculation device is also arranged to store interim or final results of calculations in the memory device 121.

Further, the control device is equipped with elements/devices 122, 123, 124, 125 for receipt and sending of input and output signals, respectively. These input and output signals may contain waveforms, pulses, or other attributes, which may be detected by the devices for the receipt of input signals as information for processing by the calculation device 120. The devices 123, 124 for sending output signals are arranged to convert the calculation result from the calculation unit 120 to output signals for transfer to other parts of the vehicle's control system and/or the component(s) for which the signals are intended. Each one of the connections to the devices for receipt and sending of input and output signals may consist of one or several of cables; a data bus, such as a CAN (Controller Area Network) bus, a MOST (Media Oriented Systems Transport), or any other suitable bus configuration; or of a wireless communications connection.

More specifically, a (control) system according to the present invention comprises a control device arranged to control the driveline in a vehicle for the activation or deactivation of coasting based on one or several first parameters $P_1$ and one or several second parameters $P_2$ for the regulation of a temperature $T_{Ex}$ in the said exhaust system, where at least one of the one or several first parameters $P_1$ is a first temperature difference between a first temperature $T_1$ in the said exhaust system and a reference temperature $T_{Ref}$, and the said second parameter $P_2$ is related to a calculated speed and/or a calculated road inclination over road sections ahead of the motor vehicle. As a person skilled in the art will realise, this system may be implemented in a control system described above. Further the present invention also pertains to a motor vehicle 100, such as a bus, a truck or a similar motor vehicle, comprising at least one system according to the above.

Finally, it should be realised that the present invention is not limited to the embodiments of the invention described above, but pertains to and comprises all embodiments within the protected scope of the enclosed independent claims.

The invention claimed is:

1. A method for regulation of a temperature in an exhaust system in a motor vehicle through control of a driveline of the motor vehicle,
    the driveline including a combustion engine connectable to a gearbox via a clutch device, and the motor vehicle including an exhaust system arranged for the removal of an exhaust stream from the combustion engine and the method comprising:
    calculating a speed and/or a road inclination over a road section ahead of the motor vehicle; and
    controlling of the driveline to activate or deactivate coasting of the motor vehicle based on at least one first parameter $P_1$ and on at least one second parameter $P_2$ for the regulation of a temperature $T_{Ex}$ in the exhaust system;
    wherein the at least one first parameter $P_1$ is a first temperature difference between a first temperature $T_1$ in the exhaust system and a reference temperature $T_{Ref}$; and
    the at least one second parameter $P_2$ is related to the calculated speed and/or the calculated road inclination over the road section ahead of the motor vehicle.

2. A method according to claim 1, wherein the at least one first parameter $P_1$ is another first temperature, or a second temperature difference between the another first temperature and a second temperature $T_2$ in the exhaust system.

3. A method according to claim 2, wherein the another first temperature is a temperature in the exhaust stream and the said second temperature $T_2$ is a surface, liquid or substrate temperature in the exhaust system.

4. A method according to claim 1, wherein the at least one first parameter $P_1$ is a time derivative or a time integral of the first temperature $T_1$ of the another first temperature or the first temperature difference or the second temperature difference.

5. A method according to claim 1, wherein the at least one first parameter $P_1$ is calculated over a road section ahead of movement of the motor vehicle based on one or several vehicle-specific and/or road-specific data for the motor vehicle.

6. A method according to claim 5, wherein the vehicle-specific and/or road-specific data are selected from the group comprising: a road inclination, curve radii, speed limits; a weight for the said motor vehicle; a rolling resistance; an air resistance; engine specific data including maximum output, minimum output, maximum torque, minimum torque, exhaust flow, exhaust gas recirculation content, lambda values, and injection parameters.

7. A method according to claim 1, wherein coasting of the vehicle is activated if a value for the at least one first parameter $P_1$ and/or the at least one second parameter $P_2$ is below a threshold value $P_T$.

8. A method according to claim 7, wherein the controlling of the driveline to activate or deactivate coasting is also based on a requested engine power and/or a requested engine torque.

9. A method according to claim 7, wherein coasting is activated through:
engaging the gearbox in a neutral gear; or
opening of the clutch device.

10. A method according to claim 7, further comprising, when coasting is activated,
controlling of at least one external load to increase or reduce the temperature $T_{Ex}$ in the exhaust system based on the at least one first parameter $P_1$, the external load of which is installed on an engine side of the clutch device/gearbox.

11. A method according to claim 10, wherein the external load is at least one load selected from the group comprising: auxiliaries including at least one of a water pump, a fan or a compressor; a generator; a hybrid generator or a similar energy recycling system; a retarder, an exhaust brake or another auxiliary brake.

12. A method according to claim 11, further comprising increasing the external load if the temperature $T_{Ex}$ in the exhaust system is to be increased.

13. A method according to claim 1, wherein the method further comprises, when coasting is activated,
controlling of an external system arranged for conversion of exhaust heat into energy (WHR) based on the at least one first parameter $P_1$ for regulation of the temperature $T_{Ex}$ in the exhaust system.

14. A method according to claim 13, wherein the external system is installed upstream of an area in the exhaust system in which a temperature is to be obtained; and further comprising controlling the external system to operate in a normal mode if the temperature $T_{Ex}$ the exhaust system is to be reduced, and in an opposite mode if the temperature $T_{Ex}$ in the exhaust system is to be increased.

15. A method according to claim 13, wherein the method further comprises, when coasting is activated,
controlling at least one external heater based on the at least one first parameter $P_1$ for the reduction or increase of the concentration/fraction in the exhaust system.

16. A method according to claim 15, wherein the external heater is selected from the group comprising: a burner installed in the exhaust system after the combustion engine's cylinders; a system arranged for the injection of hydrocarbons for the oxidation or combustion on a catalyst placed in the exhaust system; an electric heater installed in the exhaust system after the combustion engine's cylinders; and another external heater installed in or in close connection to the exhaust system.

17. A method according to claim 13, wherein the method further comprises, when coasting is activated,
controlling a fuel injection system arranged for injection of fuel to the combustion engine based on the at least one first parameter $P_1$ for regulation of the temperature $T_{Ex}$ in the exhaust system.

18. A method according to claim 13, wherein the method further comprises, when coasting is activated,
controlling an exhaust flow in the exhaust stream, or of a parameter dependent on the exhaust flow, the parameter being heat transfer coefficients, based on the at least one first parameter $P_1$ for regulation of the temperature $T_{Ex}$ in the exhaust system.

19. A method according to claim 18, wherein the control of the exhaust stream comprises:
controlling a gas flow system for exhaust gas recirculation (EGR) arranged for the combustion engine based on the at least one first parameter $P_1$ for regulation of the temperature $T_{Ex}$ in the exhaust system; and/or
controlling of an intake system arranged for regulation of an air flow into the combustion engine based on the at least one first parameter $P_1$ for regulation of the temperature $T_{Ex}$ in the exhaust system.

20. A method according to claim 19, wherein the control of the gas flow system for exhaust gas recirculation (EGR) and/or control of the intake system is also based on one or several additional parameters related to a transferred output to a component installed in the exhaust system and/or emissions produced by the combustion engine.

21. A method according to claim 18, wherein the control of the exhaust stream comprises:
increasing an engine speed in the combustion engine to increase the exhaust flow, if a value for the at least one first parameter $P_1$ exceeds a first threshold value; and
reducing of an engine speed in the combustion engine to reduce the exhaust flow, if a value for the at least one first parameter $P_1$ is below a second threshold value.

22. A method according to claim 13, wherein the reference temperature $T_{Ref}$ is one of a temperature in a component of the exhaust system, a temperature of a liquid injected in the exhaust system, and a temperature of a component installed in connection with the said exhaust system.

23. A computer program product including a non-transitory computer readable medium and a computer program recorded on the medium, wherein the computer program is included in the computer readable medium and when the said program code is executed in a computer, the computer carries out the method according to claim 1.

24. A system configured for controlling a driveline in a motor vehicle, wherein the driveline includes a combustion engine connectable to a gearbox via a clutch device, and the motor vehicle includes an exhaust system configured for removing an exhaust stream from the combustion engine; comprising:
a control device comprising or connected to a calculation device that calculates a speed and/or a road inclination over a road section ahead of the motor vehicle, the control device being arranged to control the driveline to activate or deactivate coasting of the vehicle based on at least one first parameter $P_1$ and at least one second parameter $P_2$ for regulation of a temperature $T_{Ex}$ in the exhaust system;
wherein the at least one first parameter $P_1$ is a first temperature difference between a first temperature $T_1$ in the exhaust system and a reference temperature $T_{Ref}$; and the at least second parameter $P_2$ is related to the calculated speed and/or the calculated road inclination over the road section ahead for the motor vehicle.

25. A motor vehicle comprising at least one system according to claim 24.

* * * * *